(12) United States Patent
Sugasawa et al.

(10) Patent No.: US 9,122,779 B2
(45) Date of Patent: Sep. 1, 2015

(54) BRIDGE DEVICE WITH AN ERROR TOLERANT DMA TRANSFER FUNCTION

(71) Applicant: KABUSHIKI KAISHA TOSHIBA, Minato-ku, Tokyo (JP)

(72) Inventors: Nobuhiko Sugasawa, Tokyo (JP); Yuta Kobayashi, Kanagawa-ken (JP); Masataka Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/928,899

(22) Filed: Jun. 27, 2013

(65) Prior Publication Data

US 2014/0006647 A1 Jan. 2, 2014

(30) Foreign Application Priority Data

Jul. 2, 2012 (JP) .................. 2012-148596

(51) Int. Cl.
| | | |
|---|---|---|
| G06F 3/00 | (2006.01) | |
| G06F 13/28 | (2006.01) | |
| G06F 13/34 | (2006.01) | |
| G06F 3/06 | (2006.01) | |

(52) U.S. Cl.
CPC ............ G06F 13/34 (2013.01); G06F 3/061 (2013.01); G06F 3/0656 (2013.01); G06F 3/0658 (2013.01); G06F 3/0659 (2013.01); G06F 3/0688 (2013.01)

(58) Field of Classification Search
None
See application file for complete search history.

(56) References Cited

U.S. PATENT DOCUMENTS

| | | | |
|---|---|---|---|
| 5,752,256 A * | 5/1998 | Fujii et al. ................. | 711/114 |
| 7,152,129 B2 | 12/2006 | Muro | |
| 7,305,499 B2 | 12/2007 | Furuta et al. | |
| 7,415,636 B2 | 8/2008 | Takahashi | |
| 8,195,845 B2 | 6/2012 | Fujimoto | |
| 2008/0270642 A1 * | 10/2008 | Komori ..................... | 710/34 |

FOREIGN PATENT DOCUMENTS

| | | |
|---|---|---|
| JP | 2002-041446 | 2/2002 |
| JP | 2005-056067 | 3/2005 |
| JP | 2005-070992 | 3/2005 |
| JP | 2005-165619 | 6/2005 |

(Continued)

OTHER PUBLICATIONS

Office Action of Notification of Reason for Rejection for Japanese Patent Application No. 2012-148596 Dated Jun. 24, 2014, 10 pgs.

(Continued)

*Primary Examiner* — Idriss N Alrobaye
*Assistant Examiner* — David Martinez
(74) *Attorney, Agent, or Firm* — Amin, Turocy & Watson, LLP

(57) ABSTRACT

There is provided a bridge device in which a reception unit receives first transfer information specifying a read address from an external device; a transfer information storage stores the first transfer information; a first processing unit generates a first command to instruct reading data from the read address of a data storage based on the first transfer information read from the transfer information storage and outputs the first command to the first controller; a data buffer retains the data read by the first controller from the read address; and a second processing unit generates a second command to instruct the second controller to read the data retained in the data buffer, and outputs the second command to the second controller.

24 Claims, 13 Drawing Sheets

(56) References Cited

FOREIGN PATENT DOCUMENTS

| | | |
|---|---|---|
| JP | 2006-085592 | 3/2006 |
| JP | 2006-119982 | 5/2006 |
| JP | 2007-334555 | 12/2007 |
| JP | 2012-089105 | 5/2012 |

OTHER PUBLICATIONS

Japanese Office Action for Japanese Patent Application No. 2012-148596 mailed Oct. 28, 2014.

\* cited by examiner

| BLOCK ADDRESS | BUFFER ADDRESS | TRANSFER SIZE | TRANSFER DIRECTION |
|---|---|---|---|
| 500 | 0x10000000 | 10 | R |
| 1000 | 0x30000000 | 15 | R |
| 200 | 0x11000000 | 10 | W |
| ... | ... | ... | ... |

FIG. 4

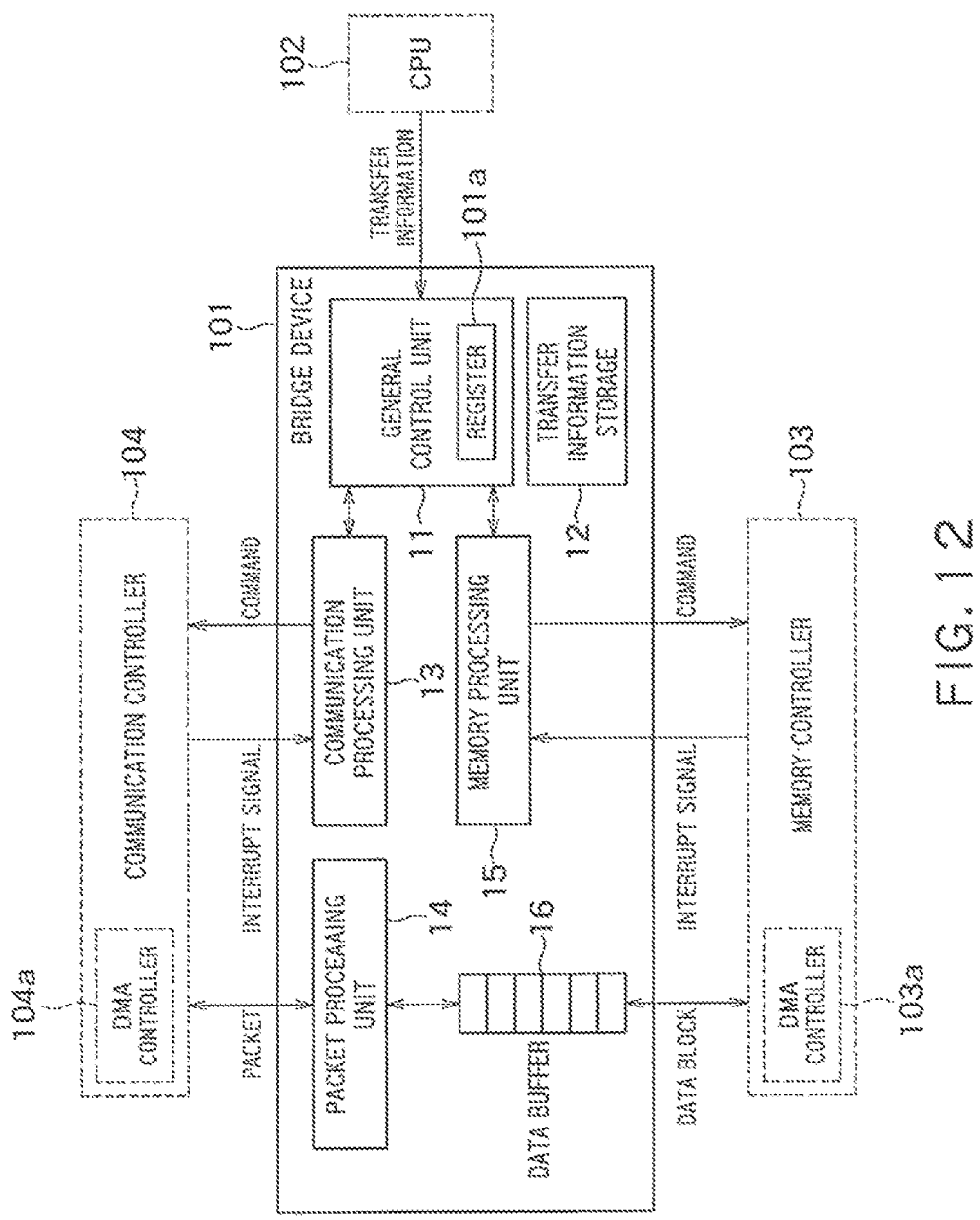
F I G. 12

BRIDGE DEVICE WITH AN ERROR TOLERANT DMA TRANSFER FUNCTION

CROSS REFERENCE TO RELATED APPLICATIONS

This application is based upon and claims the benefit of priority from the prior Japanese Patent Application No. 2012-148596 filed on Jul. 2, 2012, the entire contents of which are incorporated herein by reference.

FIELD

Embodiments described herein relates to a bridge device, a storage device and a program.

BACKGROUND

A performance improving technology related to data transfer by a bridge device has hitherto existed. The following are known as one example of the bridge device to which the performance improving technology is applied. The bridge device is configured by including an MPU (Micro Processing Unit), an interrupt controller and a data buffer. The bridge device establishes a connection between a communication controller and a memory controller that accesses a NAND flash memory. The bridge device, which includes a built-in MPU and a built-in interrupt controller, not only simply establishes a connection between bus segments but also performs a communication process such as packetizing and depacketizing, and controls the memory controller and the communication controller. Thus, the bridge device is configured to get capable of taking itself a processing burden imposed on a CPU (Central Processing Unit) which controls the bridge device, whereby the processing load on the CPU is reduced. Data transfer performance is thereby improved. Nevertheless, such problems exist that an interrupt occurs on a packet-by-packet basis, a software processing load on the MPU is high, and a sufficient throughput is not obtained.

Moreover, a system is known as another technology different from the above, the system including an interrupt proxy processing unit to improve the data transfer performance by reducing a load of a DMA (Direct Memory Access) transfer process and a load of an interrupt process with which the CPU is burdened. Nonetheless, this system has a problem of not exhibiting sufficient effects in improving the transfer performance with respect to the file transfer. A reason why so is that the file transfer process involves a process related to the file system, but it is impossible to improve the performance of the relevant part even by using this technology. Accordingly, if the file system process turns out to be a factor for deteriorating the performance, it is unfeasible to sufficiently enhance the data transfer performance of the file transfer between the storage and the network.

BRIEF DESCRIPTION OF THE DRAWINGS

FIG. 4 is a diagram showing one mode of transfer information;

FIG. 12 is a diagram showing the bridge device according to a fourth embodiment.

DETAILED DESCRIPTION

There is provided a bridge device to bridge data transfer between a first controller accessing a data storage and a second controller including a reception unit, a transfer information storage, a first processing unit, a data buffer and a second processing unit.

The reception unit receives first transfer information specifying a read address of a data storage from an external device.

The transfer information storage stores the first transfer information.

The first processing unit generates a first command to instruct reading data from the read address of the data storage on the basis of the first transfer information read from the transfer information storage and outputs the first command to the first controller.

The data buffer retains the data read by the first controller from the read address of the data storage.

The second processing unit generates a second command to instruct the second controller to read the data retained in the data buffer, and outputs the second command to the second controller.

Hereinafter, embodiments will hereinafter be described with reference to the drawings.

(First Embodiment)

Figure 1:
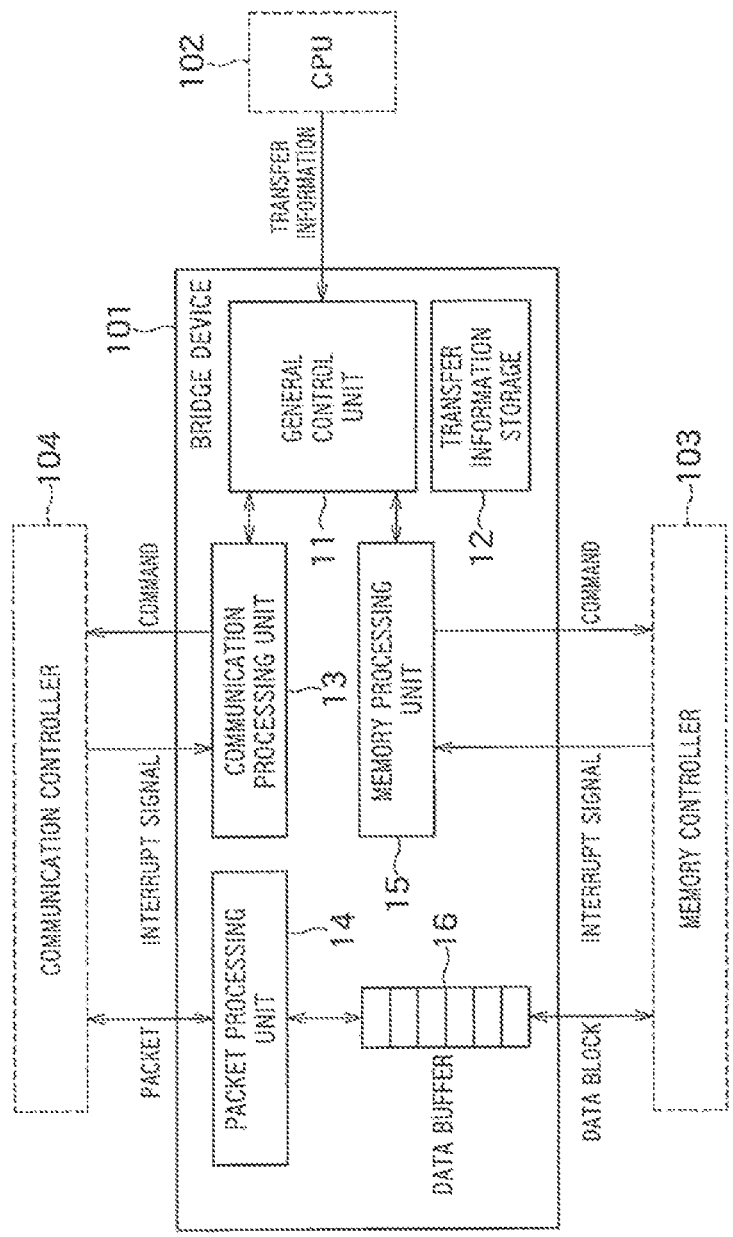
FIG. 1 is a diagram illustrating a bridge device according to a first embodiment.

FIG. 1 illustrates a bridge device according to the embodiment.

The bridge device in FIG. 1 includes a general control unit 11, a transfer information storage 12, a communication processing unit (a second processing unit) 13, a packet processing unit 14, a memory processing unit (a first processing unit) 15 and a data buffer 16. Note that the bridge device may have a built-in CPU (Central Processing Unit) or MPU (Micro Processing Unit) and may take a part or the whole of functions of these processing units. For example, the CPU or the MPU executes a program containing commands having a description of one or plural functions of these processing units, whereby the function(s) may also be realized. The program may be stored on a non-transitory computer readable recording medium such as a hard disk, a memory device and a CD-ROM.

Herein, the bridge device represents a device which connects a certain bus segment to another bus segment. The bridge device corresponds to, e.g., an HBA (Host Bus Adaptor) which connects a system bus connected to the CPU to a PCI (Peripheral Component Interconnect) bus accommodating peripheral devices, and also a PCI bus bridge which connects the PCI bus to another PCI bus.

Further, the bridge device exists in a storage device such as an HDD (Hard Disk Drive) and an SSD (Solid State Drive). For instance, on the occasion of connecting a storage medium (which is a unit corresponding to a platter in the case of the HDD and a NAND flash memory in the case of the SSD) to the system bus, the bridge device taking an intermediary between the bus and the medium is disposed.

The bridge device in FIG. 1 bridges data transfer between a memory controller 103 and a communication controller 104. The memory controller 103 controls an access (read/write) to an unillustrated data storage (refer to, e.g., a NAND flash memory 112 in FIG. 2). The communication controller 104 may be a communication controller for Ethernet, IEEE802.11a/b/g and Bluetooth. The memory controller 103 and the communication controller 104 are each connected to an unillustrated bus.

The CPU 102 or MPU dedicated to the present bridge device is provided outside the bridge device.

The general control unit 11 is a unit for accepting control and setting from the external CPU 102 or MPU. The "control" is exemplified by starting and stopping the data transfer with respect to the bridge device.

The transfer information storage 12 is a unit for storing transfer information containing various items of information needed for the bridge device to transfer a file. The transfer information is created by the CPU 102 or MPU and supplied to the bridge device. The general control unit 11 includes a reception unit for receiving this transfer information and stores the received transfer information on the transfer information storage 12.

The following is a description of the transfer information.

FIG. 4 shows one mode of the transfer information.

The transfer information shown in FIG. 4 has a table format containing four fields, i.e., a "transfer direction" field, a "block address" field, a "buffer address" field and a "transfer size" field. One row (one entry) of the transfer information represents that the data transfer is executed at one time.

The "transfer direction" specifies whether the data transfer indicates transmission (read from the data storage) or reception (write to the data storage). The transmission (read) is notated by "R", and the reception (write) is notated by "W".

The "block address" indicates a recording position of a data block stored on the data storage. The data storage is stored with the data on a block-by-block basis.

The "buffer address" indicates an address of the data buffer 16 serving as a transfer source of the data block (when the transfer direction is "R") or alternatively indicates an address of the data buffer 16 serving as a transfer destination (when the transfer direction is "W").

The "transfer size" indicates a data size that is transmitted or received by the data transfer at one time.

For example, the entry of the first row implies that the 10-block data are read from a block address "500" on the data storage and written from an address "0x10000000" of the data buffer 16. A size of one block can be arbitrarily set such as 32 KB.

Further, the entry of the third row implies that the 10-block data are read from an address "0x11000000" of the data buffer 16 and written from a block address "200" on the data storage.

The bridge device processes the entries sequentially from the uppermost entry in the Table and executes the one-time data transfer of one row (one entry) of the transfer information. When the transfer information is newly added, this new information is added to the lowermost row. Namely, a higher priority level is allocated to the entry received earlier. In the present example, though the priority level is expressed by a position in the Table, a "priority level" field is added, and a processing sequence may be entered in this field.

The transfer information shown in FIG. 4 is one example and can involve adopting a different format. For instance, all the block addresses, which should be read and written, may be entered in the "block address" field, while the "transfer size" field is omitted. Alternatively, a start block address and an end block address may also be entered.

Moreover, the "buffer address" field can be also omitted. In this case, the general control unit 11 may be provided with a register for storing the buffer address. The buffer address stored on the register may take a fixed value. It is considered that a plurality of buffer addresses is stored on the register and used in circulation.

The communication processing unit 13 is a unit that takes the control of the communication controller 104, which is related to the data transfer. For example, when receiving an interrupt signal from the communication controller 104, the communication processing unit 13 queries the communication controller 104 about a cause of the interrupt signal and behaves corresponding to a content thereof. If there is a DMA (Direct Memory Access) controller (see FIG. 12) built in the communication controller 104, the communication processing unit 13 controls also the DMA controller.

The packet processing unit 14 is a unit that attaches a header to a packet to be transmitted to the communication controller 104 and analyzes the header of the packet received from the communication controller 104. When the received packet is analyzed from the header as a packet which carries the data to the data storage, the packet processing unit 14 detaches (discards) the header and passes the data stored in a payload field of the packet over to the data buffer 16. The data buffer 16 writes the data to a write destination specified from the communication controller 104. As a result of analyzing the header, if the data of this packet is not the data that is to be written to the data storage, the data is not written to the data buffer 16. For example, if the packet is determined to be addressed to the CPU 102, the packet is passed to the CPU 102. The determination such as this can be made based on, e.g., a value in a predetermined field within the header.

The memory processing unit 15 is a unit taking the control of the memory controller 103, which is related to the data transfer. For instance, when receiving the interrupt signal from the memory controller 103, the memory processing unit 15 queries the memory controller 103 about a cause of the interrupt signal and behaves corresponding to a content thereof. Further, if there is the DMA controller (see FIG. 12) built in the memory controller 103, the memory processing unit 15 controls also the DMA controller.

The data buffer 16 is a memory area used when inputting and outputting the data between the communication controller 104 and the bridge device and between the memory controller 103 and the bridge device. The data buffer 16 includes a memory such as a 2-port memory, and inputs and outputs the data to the memory.

For instance, in the case of a transmission mode, the memory controller 103 reads the data read from the data storage and writes the readout data to the data buffer 16, while the communication controller 104 reads the data from the data buffer 16. The data buffer 16 includes an output unit which outputs the data existing at the buffer address specified from the communication controller 104.

In the case of a reception mode, the communication controller 104 writes the data to the data buffer 16 via the packet processing unit 14, while the memory controller 103 reads the data.

Figure 5:
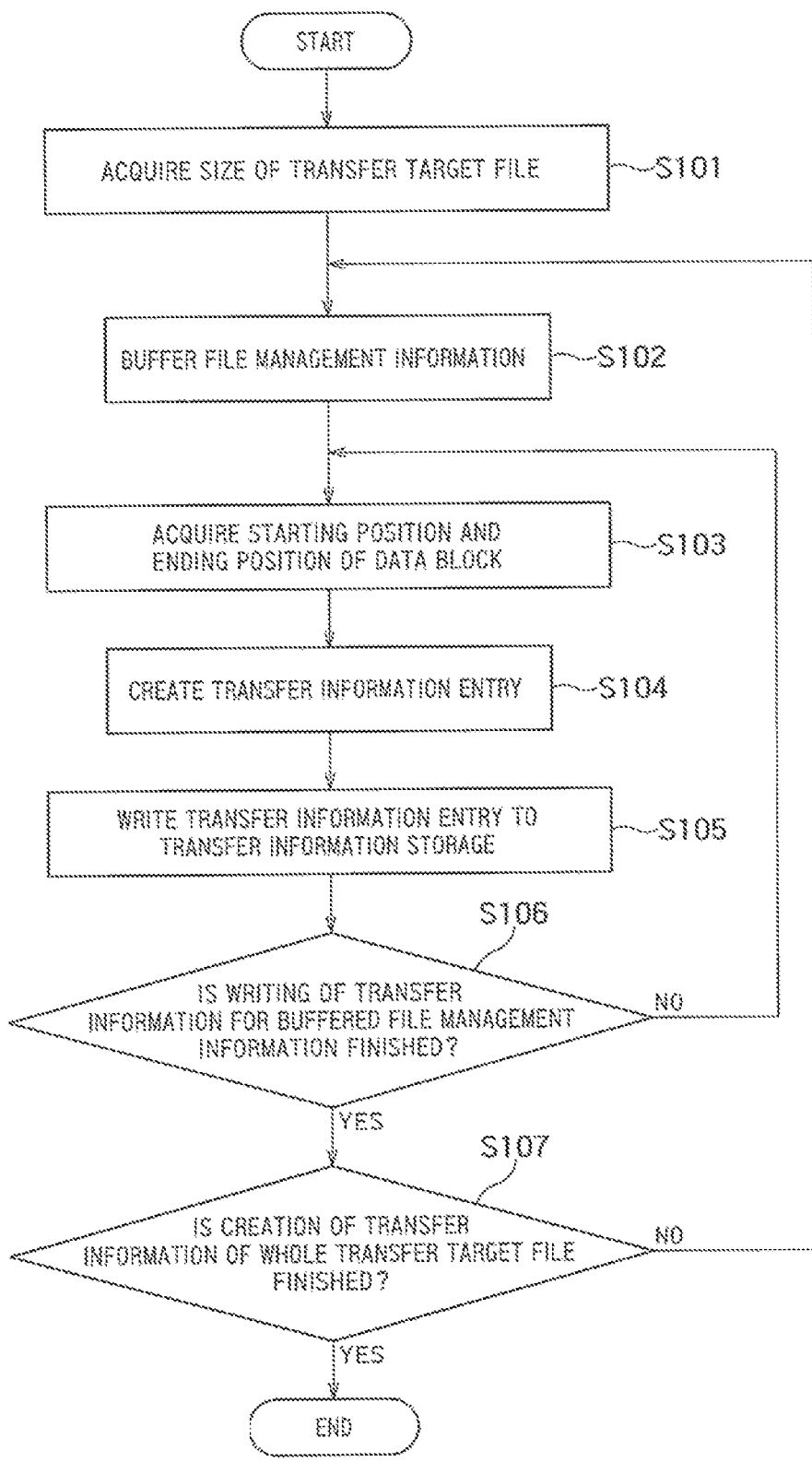
FIG. 5 is a flowchart showing a procedure of creating the transfer information.

FIG. 5 is a flowchart showing a procedure of creating the transfer information.

To start with, the CPU 102 or MPU acquires a size of a transmission or reception target file (S101). Especially in the case of the reception mode, in advance of starting the transfer, it is required that a recording area for this file size is allocated onto the data storage. There are a variety of methods of acquiring the file size, and, for example, the information on the file size of the file to be transmitted to the reception side from the transmission side may be notified. Information on a file name may also be notified together with the file size.

Such a case is assumed by way of one example that the communication device including the bridge device in FIG. 1 is connected via a network to another peer communication device, and the present bridge device acts as the reception side, while the peer communication device acts as the transmission side. The transmission-side device may be mounted with a bridge device having the same configuration as the present bridge device has. At this time, the communication controller 104 and the CPU 102 of the communication device including the present bridge device perform communications with the peer communication device, whereby the CPU 102 acquires the file size from the peer communication device.

Subsequently, the CPU 102 or MPU reads management information of the transmission or reception target file into a shared memory (unillustrated) such as a working memory (S102). The shared memory is a storage different from the data storage and is, e.g., a volatile memory. The single file is not recorded in the consecutive area on the data storage, but normally the plurality of data blocks is allocated in dispersion on the data storage. The file management information indicates structural information for managing the dispersedly allocated data blocks in a string-of-beads form.

The management information is stored on the data storage accessed by the memory controller 103. The management information is stored in a management area provided separately from the data area for storing the data blocks.

Figure 6:
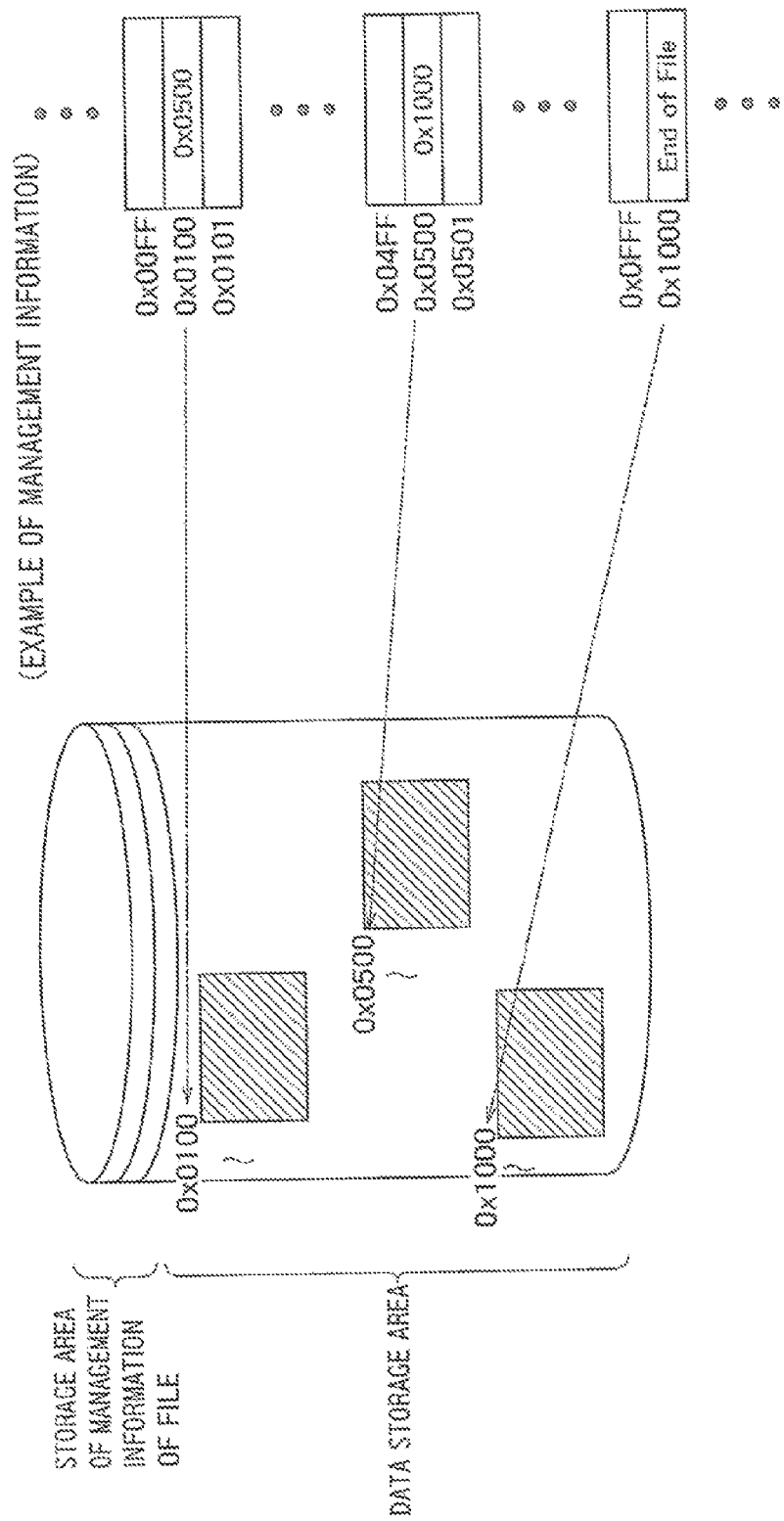
FIG. 6 is a diagram illustrating a structure of a storage area of a data storage and one example of management information.

FIG. 6 illustrates one example of a structure of the storage area of the data storage and the management information as well. The management information is stored in the management area. The management information has a list structure. In the example of FIG. 6, an aggregation of the data stored in a block address 0x000, 0x0500, 0x1000" corresponds to one file specified by the management information. The data size of one block address is a predetermined size given when formatting the data storage.

In the case of the transmission, the CPU 102 or MPU reads the management information by directly accessing the data storage, and writes the data to the shared memory. In the case of the reception, the management information is acquired from the peer communication device. It can be thereby known what type of block size is transmitted from the peer communication device. Note that the acquisition of the management information from the peer communication device is not indispensable, and the present device is operable so long as the file size is known.

Subsequently, the CPU 102 or MPU goes on searching for the recording positions of the data blocks on the data storage by referring to the management information buffered in the working memory, and, if being the adjacent data block, deals with these data blocks as one consecutive area. In the case of the transmission, it may be sufficient to check whether the data block to be transmitted is adjacent or not. In the case of the reception, the CPU 102 or MPU goes on searching for empty data blocks and may check whether these data blocks are adjacent or not. A starting position and an ending position of the consecutive area are thus acquired (S103).

Then, a block size and a transfer size are determined based on the starting position and the ending position of the consecutive area, and one entry of the transfer information is created (S104). If in the case of the transmission, the block address of the transfer information corresponds to the starting position of the consecutive area, and the transfer size is a data size extending from the starting position to the ending position. If in the case of the reception, reception file sizes are sequentially allocated to the respective consecutive areas, thereby determining the block addresses and the transfer sizes. Note that if capable of ensuring the consecutive area having the same size as the block size specified by the management information acquired from the peer communication device in the case of the reception, the transfer information entry may be created so as to allocate the consecutive area having the same size.

Subsequently, the CPU 102 or MPU writes the completed transfer information entry to the transfer information storage 12 of the bridge device (S105). For example, the CPU 102 or MPU instructs the general control unit 11 to write the transfer information entry, and the general control unit 11 writes the transfer information entry.

Steps S103-S105 are iterated till the transfer information entry for the buffered file management information can be created (S106).

After creating all the transfer information entries for the buffered file management information, it is determined whether the transfer information entries for the management information of the whole file size can be created or not. That is, if there is still the management information not yet read into the working memory, the CPU 102 or MPU again reads the management information (buffering) and repeats the procedures made so far (S107). This is because there is no guarantee in terms of a restraint on a capacity of the working memory that all the management information can be read at one time. Moreover, as will be stated in a working example that will be described later on, this takes into consideration that a configuration of starting the transfer on the basis of the transfer information entries before a completion of buffering all the management information.

Figure 7:
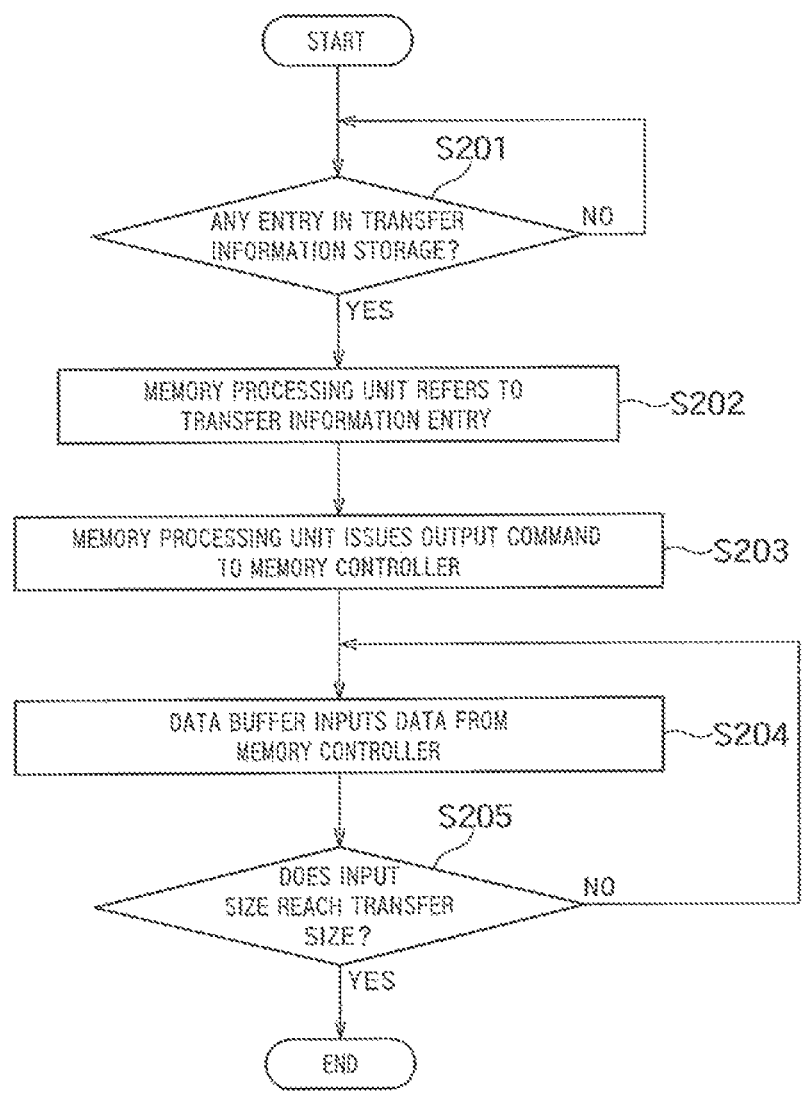
FIG. 7 is a flowchart showing a procedure between a memory processing unit and a data buffer.
Figure 8:
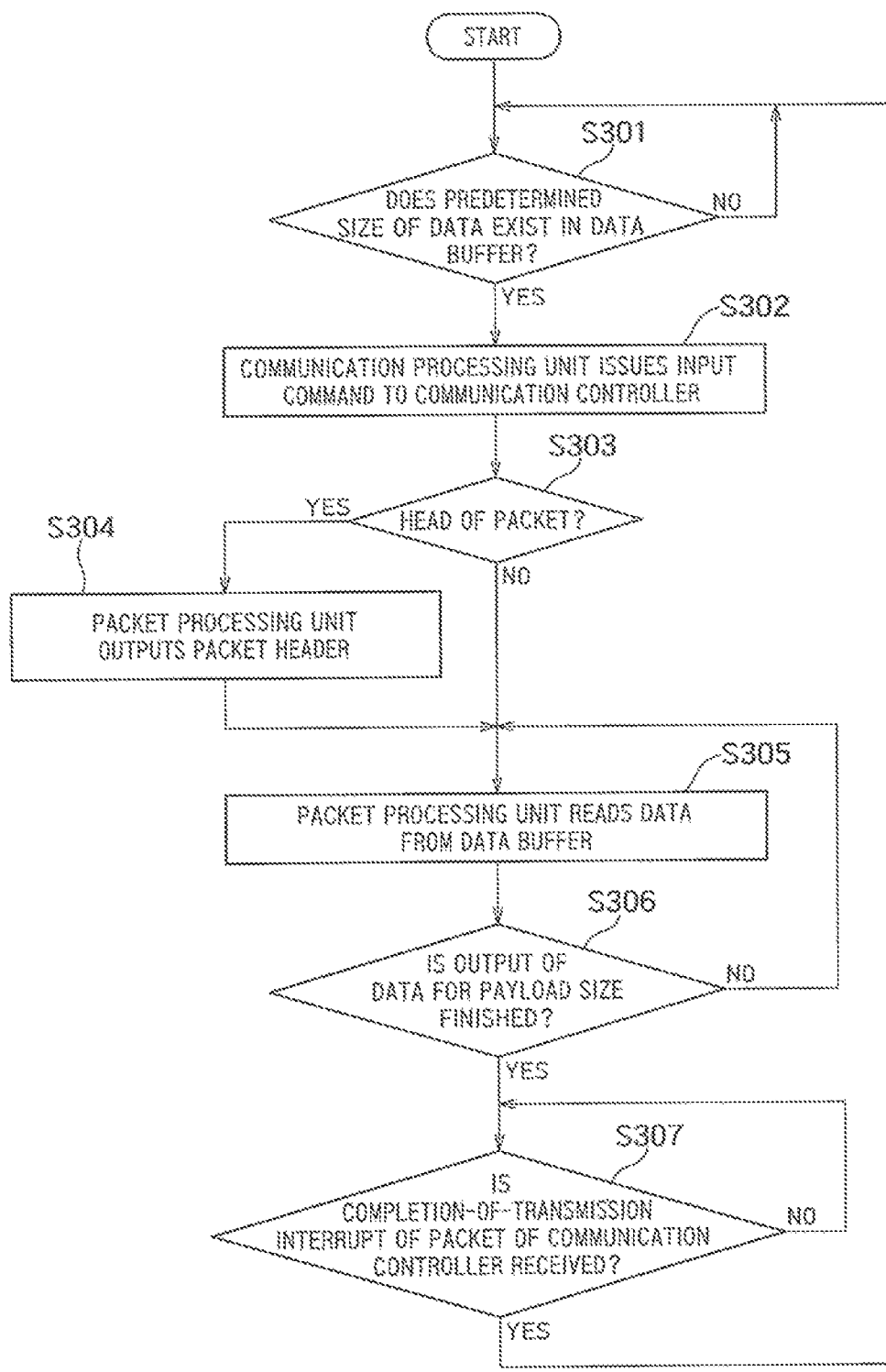
FIG. 8 is a flowchart showing a procedure between a communication processing unit and the data buffer.

A file transfer procedure in the transmission mode will hereinafter be demonstrated with reference to FIGS. 7 and 8. A flowchart in FIG. 7 shows a procedure between the memory processing unit 15 and the data buffer 16. A flowchart in FIG. 8 shows a procedure between the communication processing unit 13 and the data buffer 16.

To begin with, the procedure between the memory processing unit 15 and the data buffer 16 in the transmission mode will be described by using the flowchart in FIG. 7.

In the file transfer by the bridge device in the transmission mode, a start of the operation of the memory processing unit 15 is triggered by an existence of the entry in the transfer information storage 12 (S201). For instance, the general control unit 11 accesses the transfer information storage 12 and detects the entry with the transfer direction being the transmission ("R"), whereby the operation in the transmission mode starts.

The memory processing unit 15 acquires the entry information (the block addresses, the buffer addresses, the transfer sizes and the transfer directions) by referring to the entries in the transfer information storage 12 (S202).

The memory processing unit 15 issues a data output command to the memory controller 103 by use of the entry information (S203). When the buffer address is not stored in the transfer information but stored in the register of the general control unit 11 etc, the buffer address is acquired by accessing this register.

The "output command" connoted herein indicates a series of overall control procedures carried out when executing the data transfer to the register of the memory controller 103 itself, or to the DMA controller having the built-in memory controller 103, or to the data storage accessed via this DMA controller.

The data output command (a first command) is issued to the memory controller 103, whereby, e.g., the DMA controller having the built-in memory controller 103 executes a process of reading the data block existing at the block address (a read address) specified by the output command and writing the readout data block to the buffer address (a write address) specified by the output command. An address of the data buffer 16 is designated as the buffer address, and the bridge device thereby read the data to be transmitted into the data buffer 16 of the bridge device itself.

Subsequently, the data buffer 16, when receiving the data from the memory controller 103, goes on writing the data to the internal memory (e.g., a 2-port memory) (S204).

When the data size inputted to the data buffer 16 reaches the transfer size indicated in the transfer information entry, the data transfer for one entry is completed (S205). Upon completing the data transfer for one entry, the memory controller 103 notifies the memory processing unit 15 of its completion.

The procedures described above are repeated with respect to each transfer information entry (with the transfer direction being "R") of one file, thereby advancing the data transfer from the memory controller 103 to the data buffer 16.

Next, procedures between the communication processing unit 13 and the data buffer 16 in the transmission mode will be described by using the flowchart in FIG. 8.

The communication processing unit 13, if a predetermined size of data exist within the data buffer 16 (S301), issues an input command (a second command) to the communication controller 104 (S302). For example, if the data size stored at addresses on and after the buffer address specified in the relevant transfer information entry is equal to or larger than the predetermined size, issues the input command.

The "input command" connoted herein indicates a series of overall control procedures conducted when executing the data transfer to the register of the communication controller 104 itself, or to the DMA controller having the built-in communication controller 104, or to a wireless unit accessed via this DMA controller.

For instance, the DMA controller having the built-in communication controller 104 reads the data existing at the buffer address (a read address) specified from the communication processing unit 13. The bridge device receives a read request specifying the address of the data buffer 16 and thereby reads the data from the data buffer 16 and transmit the readout data to the communication controller 104 via the packet processing unit 14.

Herein, the "predetermined size" is a size that is determined in a freehand manner on the basis of a data filling quantity of the data buffer 16 but is not related to the nature of the present embodiment. Further, though the discussion proceeds herein by taking a determination index as "size" for example, the start of the operation of the communication processing unit 13 may not be always triggered by this index.

Subsequently, the packet processing unit 14 checks whether the data to be output to the communication controller 104 exists at the head of the packet or not (S303). If this data corresponds to the data existing at the head of the packet, a header is inserted into a field just before the data (data field) (S304), and the data is thereafter output (S305). If not at the head of the packet, the packet processing unit 14 outputs the data (S305).

The output packet data is passed to the communication controller 104. The communication controller 104 performs a process of writing the header and the data to a block address designated beforehand within a transmission frame buffer. The transmission frame buffer may be provided within the shared memory.

The packet processing unit 14 goes on outputting till finishing outputting the data for the payload size of the packet (S306). The information entered in the header and the information about the payload size are given previously. These items of information are stored in, e.g., the register of the general control unit 11 and may be acquired by reading the same information from this register.

Next, it is determined whether the communication processing unit 13 receives a completion-of-transmission interrupt from the communication controller 104 or not (S307). For instance, it is assumed that the communication processing unit 13 specifies a sum size of a header size of the packet and the payload size and thereafter issues the input command to the communication controller 104. In this case, when finishing outputting the data for the payload size, the communication controller 104 issues the completion-of-transmission interrupt.

The communication processing unit 13, upon receiving the completion-of-transmission interrupt issued by the communication controller 104, checks a status of the communication controller 104 and clears the interrupt status. Then, the communication processing unit 13 moves to the next packet transmission, i.e., moves to the read of the data for the next packet.

The data transfer to the communication controller 104 from the data buffer 16 advances as the procedures described above are repeated.

The bridge device thus operating, the efficient file transmission process, which has not hitherto been accomplished, can be attained. Namely, the bridge device can implement a series of data transfer processes simply by referring to the prepared transfer information without any aid of the CPU or MPU. Even when the file data are allocated in dispersion within the data storage, it follows that the transmission process can be accomplished from the top to the terminal of the file.

Figure 9:
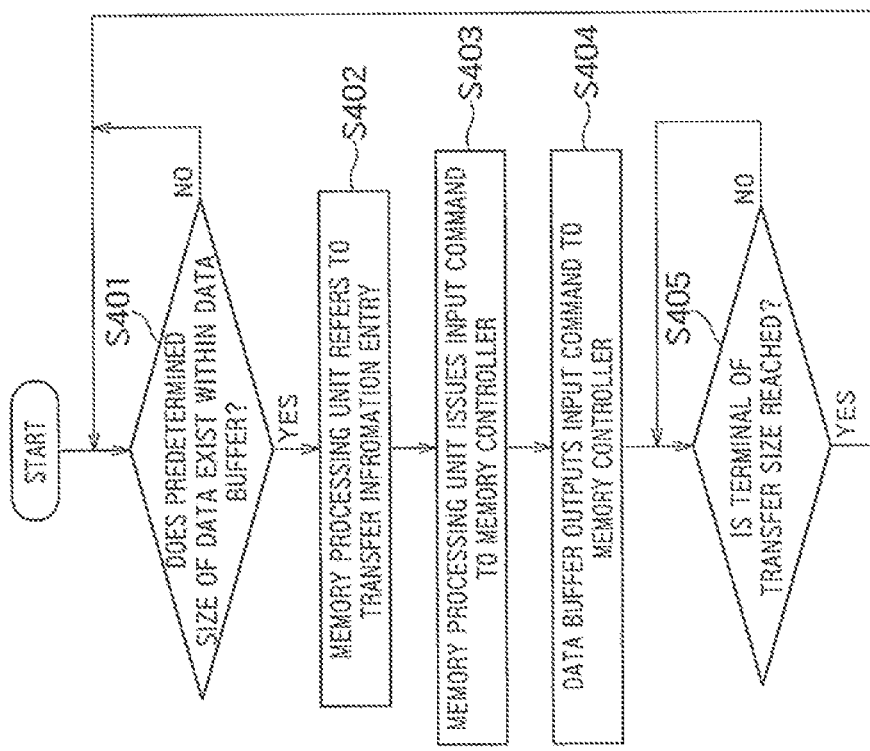
FIG. 9 is a flowchart showing the procedure between the memory processing unit and the data buffer.
Figure 10:
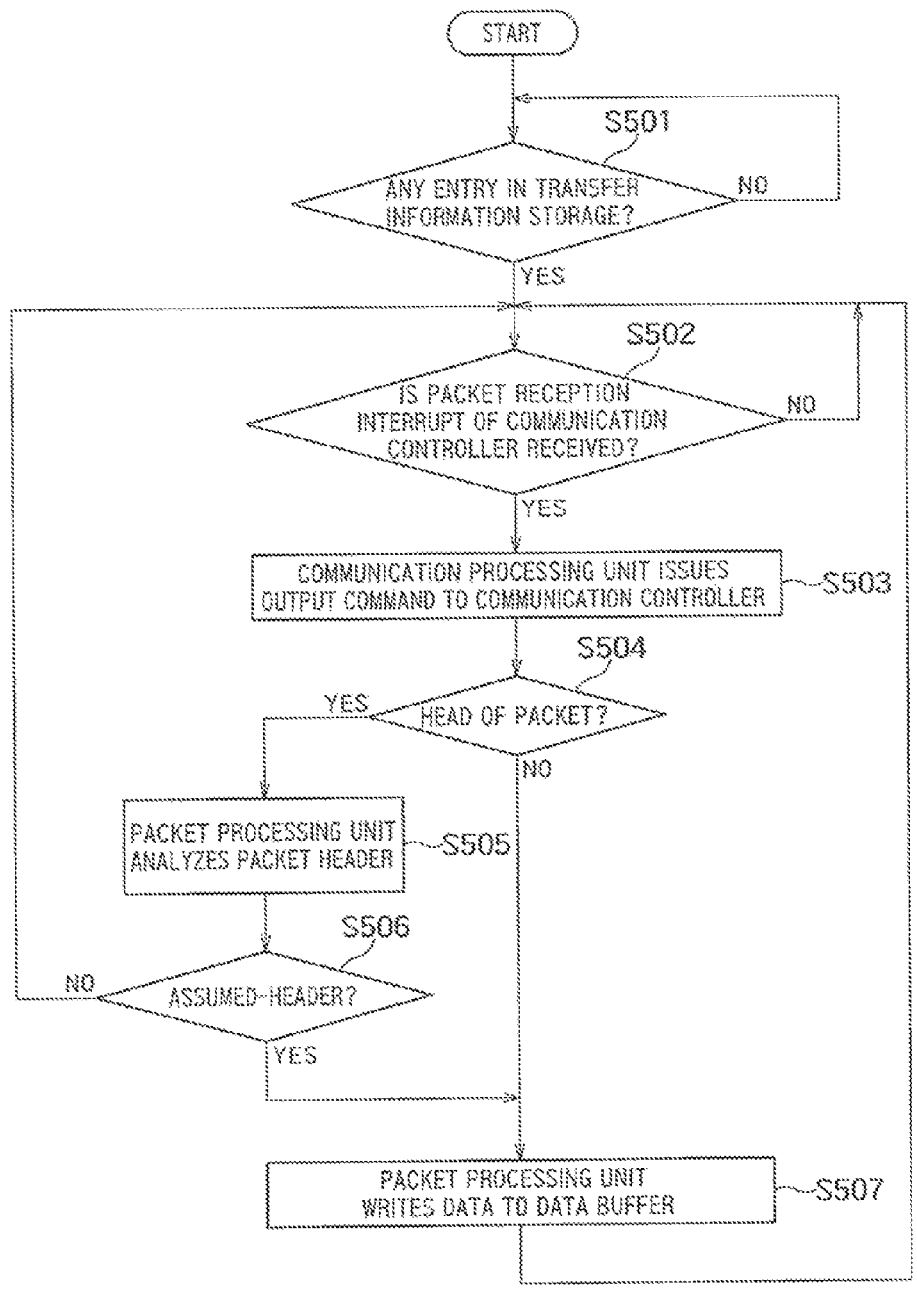
FIG. 10 is a flowchart showing a procedure between the communication processing unit and the data buffer.

A file transfer procedure in the reception mode will hereinafter be demonstrated by use of FIGS. 9 and 10. The flowchart in FIG. 9 shows a procedure between the memory processing unit 15 and the data buffer 16. A flowchart in FIG. 10 shows a procedure between the communication processing unit 13 and the data buffer 16.

At first, the procedure between the memory processing unit 15 and the data buffer 16 in the reception mode will be described by using the flowchart in FIG. 10. In the file transfer by the bridge device in the reception mode, an entry with the transfer direction being "W" exists in the transfer information storage 12 (S501), and a start of the operation of the communication processing unit 13 is triggered (S502) by a reception-of-packet interrupt issued by the communication controller 104.

The communication processing unit 13 acquires the entry information (the block addresses, the buffer addresses, the transfer sizes and the transfer directions) by referring to the entries with the transfer direction being "W" in the transfer information storage 12.

The communication processing unit 13 issues a data output command (a third command) to the communication controller 104 by use of the entry information (S503). When the buffer address is not stored in the transfer information but stored in the register of the general control unit 11 etc, the buffer address is acquired by accessing this register.

For example, the DMA controller having the built-in communication controller 104 executes a process of reading the data block existing at the block address specified beforehand within an unillustrated reception frame buffer and writing the readout data block to the buffer address (the write address) specified in the transfer information entry. The bridge device receives a write request specifying the address of the data buffer 16 and thereby reads the received data into the memory of the bridge device itself. The reception frame buffer may be provided within the shared memory.

The packet processing unit 14 checks whether the data inputted from the communication controller 104 corresponds to the data existing at the head of the packet or not (S504).

If corresponding to the data existing at the head of the packet, the header is analyzed (S505), the packet processing unit 14 checks whether the header is a header assumed for the bridge device or not, i.e., whether the packet is a packet for carrying the data to be written to the memory or not (S506). If determined to be the header not assumed for the bridge device, the packet processing unit 14 does not execute the process of receiving this packet. The determination as to whether the header is assumed or not assumed for the bridge device can be made from a value registered in a field of a predetermined location in the header. For instance, if the transmission side cancels the transmission halfway during the reception of the data, a control packet for stopping the transmission is sent and can be received as a not-assumed packet. This type of packet is determined as a (packet containing) not-assumed header. This packet may be processed according to, e.g., contents of the header. If being the packet addressed to the CPU, this packet is forwarded to the CPU.

If being the assumed header, the payload data of this packet is written from the buffer address of the data buffer 16 that is specified by the communication controller 104 (S507). Note that this header is not written to the data buffer 16 but is discarded.

Whereas if the data inputted from the communication controller 104 is not the head of the packet, the packet processing unit 14 writes the data to the data buffer 16 (S507).

The data transfer to the data buffer 16 from the communication controller 104 advances as the procedures described above are repeated with respect to each transfer information entry (with the transfer direction being "W") of one file.

Next, procedures between the memory processing unit 15 and the data buffer 16 will be described by using the flowchart in FIG. 9.

The memory processing unit 15 checks whether a predetermined size of data exists within the data buffer 16 or not (S401). For example, the memory processing unit 15 checks whether or not the data having a data size equal to or larger than the predetermined size exist at addresses on and after the buffer address specified in the relevant transfer information entry. If the predetermined size of data exist, the memory processing unit 15 issues an input command (a fourth command) to the memory controller 103 (S403) by referring to the information in the transfer information entry (S402).

The "predetermined size" is the size that is determined in the freehand manner on the basis of the data filling quantity of the data buffer 16 but is not related to the nature of the present embodiment. Further, though the discussion proceeds herein by taking the determination index as "size" for example, the start of the operation of the memory processing unit 15 may not be always triggered by this index.

The memory controller 103 receives the input command and goes on reading the data from the buffer address (the read address) of the data buffer 16 (S404). When the data size output from the data buffer 16 reaches the transfer size obtained from the transfer information entry, the data transfer for one entry is completed (S405).

The data transfer to the memory controller 103 from the data buffer 16 advances by repeating the procedures described above.

The bridge device thus operating, the efficient file reception process, which has not hitherto been accomplished, can be attained. Namely, the bridge device can alone implement a series of data transfer processes simply by referring to the transfer information prepared beforehand without any aid of the CPU 102 or MPU.

A video codec and a graphic accelerator based on MPEG (Moving Picture Experts Group) etc, which have hitherto existed, are devices for establishing a connection between some type of memories and actualize the fast data transfer therebetween. Nevertheless, this data transfer is the data transfer between the series of continuous data areas. By contrast, the present bridge device, if discontinuous areas exist in the data area, aggregates and expresses these discontinuous areas as plural pieces of transfer information, and can implement the data transfer of the discontinuous data area while interpreting these pieces of information.

As discussed above, according to the first embodiment, the file transfer can be advanced without imposing a large amount of loads on the CPU or MPU, and the throughput can be increased to the greatest possible degree.

(Second Embodiment)

Figure 2:
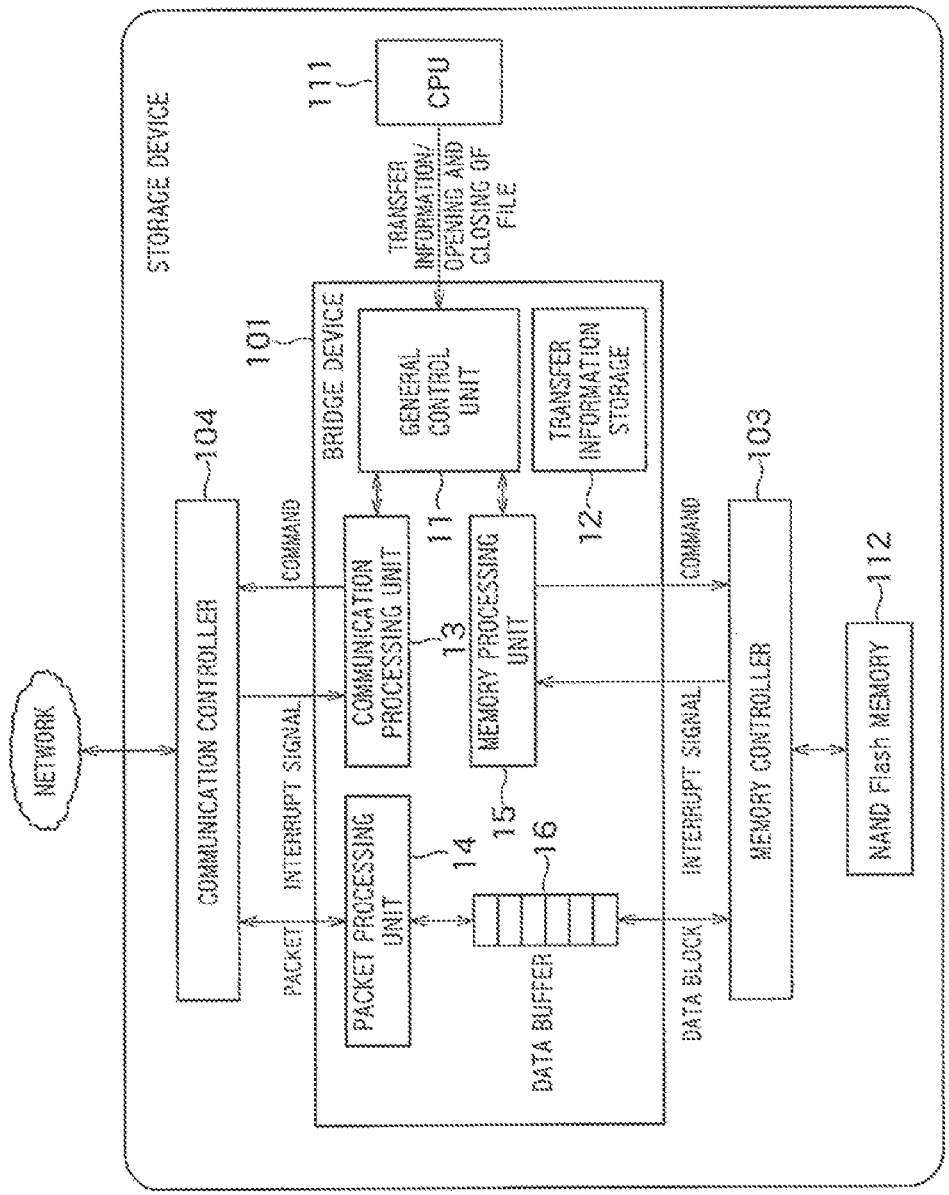
FIG. 2 is a diagram showing one embodiment of a storage device mounted with the bridge device illustrated in FIG. 1.

FIG. 2 illustrates one embodiment of the storage device mounted with the bridge device depicted in FIG. 1.

The storage device can be specifically exemplified by an SD (Secure Digital) memory card and an SSD (Solid-State Drive).

Unlike FIG. 1, the storage includes built-in components such as a CPU 111, the communication controller 104, the memory controller 103 and a NAND flash memory (data storage) 112. The CPU 111 may be a host CPU and may also be a CPU dedicated to the bridge device.

The host CPU is used and is made to perform functions taken so far by the dedicated CPU or MPU in FIG. 1, whereby the CPU dedicated to the bridge device can be made unnecessary. The dedicated CPU or MPU must not necessarily create the transfer information, and the creation of the transfer information may be enabled to be done by making the host CPU equally accessible to the NAND flash memory 112.

Thus, the bridge device can expand a variation of the embodiment in such a form.

(Third Embodiment)

Figure 3:
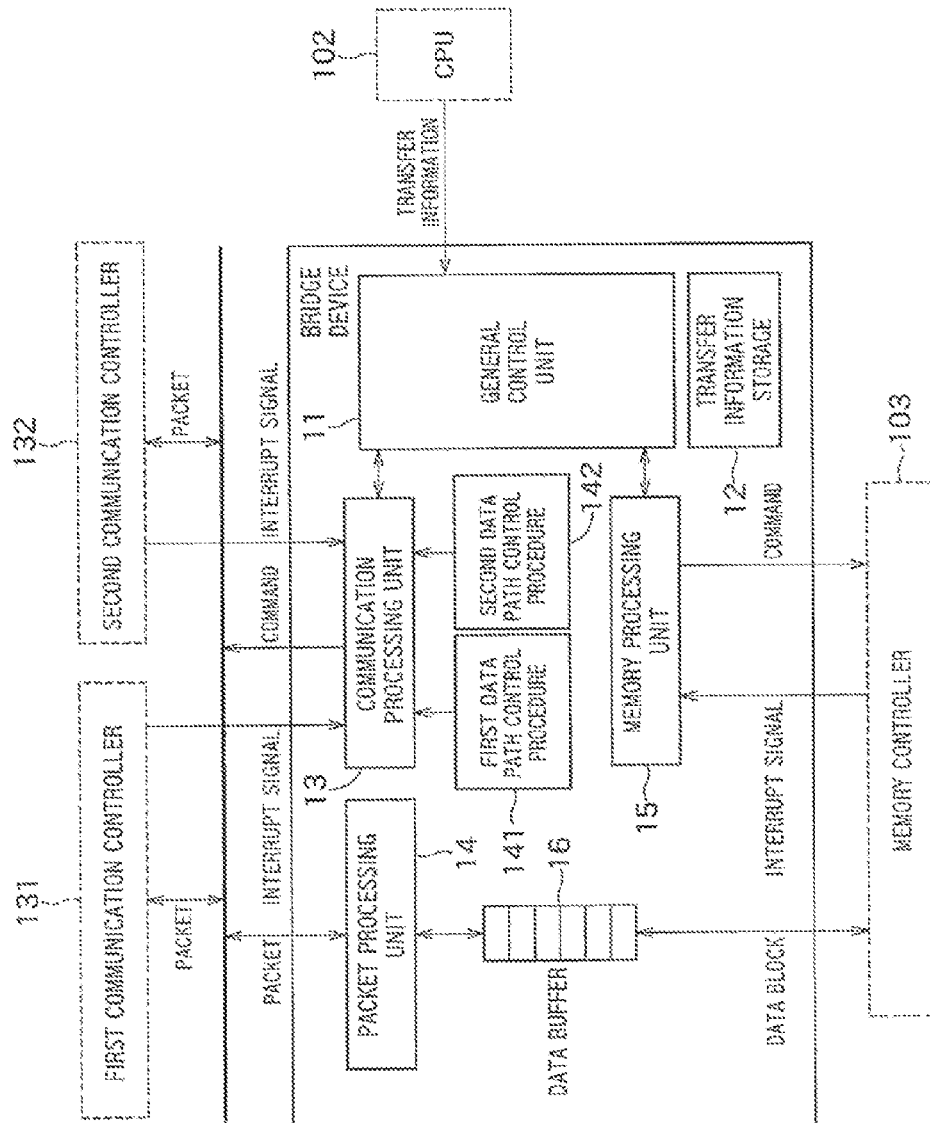
FIG. 3 is a diagram depicting the bridge device according to a third embodiment.

FIG. 3 illustrates the bridge device according to a third embodiment,

A difference from the first embodiment illustrated in FIG. 1 is a point that there is provided a plurality of communication controllers controlled by the bridge device. In the present example, the control target communication controllers are two controllers, i.e., a first communication controller 131 and a second communication controller 132.

A control procedure is prepared for every communication controller in order to enable these communication controllers 131, 132 to be controlled. To be specific, a first data path control procedure 141 for the first communication controller 131 and a second data path control procedure 142 for the second communication controller 132 are stored in the storage referable from the communication processing unit 13.

With this contrivance, even when the types of the communication controllers 104 increase, the communication processing unit 13 can control the communication controllers according to the control procedure corresponding to the communication controller in use. Hence, there is no necessity for adding the bridge device for every type of communication controller.

Such a configuration may be taken that the first data path control procedure and the second data path control procedure are prepared in a form of an electronic circuit, and the CPU 102 or MPU switches over these procedures via the general control unit 11.

Alternatively, additional memories are prepared within the bridge device, and the CPU or MPU may store micro codes of the first data path control procedure and micro codes of the second data path control procedure in these memories. In this case, the communication processing unit 13 selectively executes the micro codes that correspond to the type of the communication controller in use.

Though the third embodiment has discussed the case of providing the plurality of communication controllers, a case of providing a plurality of memory controllers is also likewise configurable. Namely, the control procedure is prepared for every type of memory controller, and the control procedure corresponding to the memory controller in use may be executed.

(Fourth Embodiment)

Figure 11:
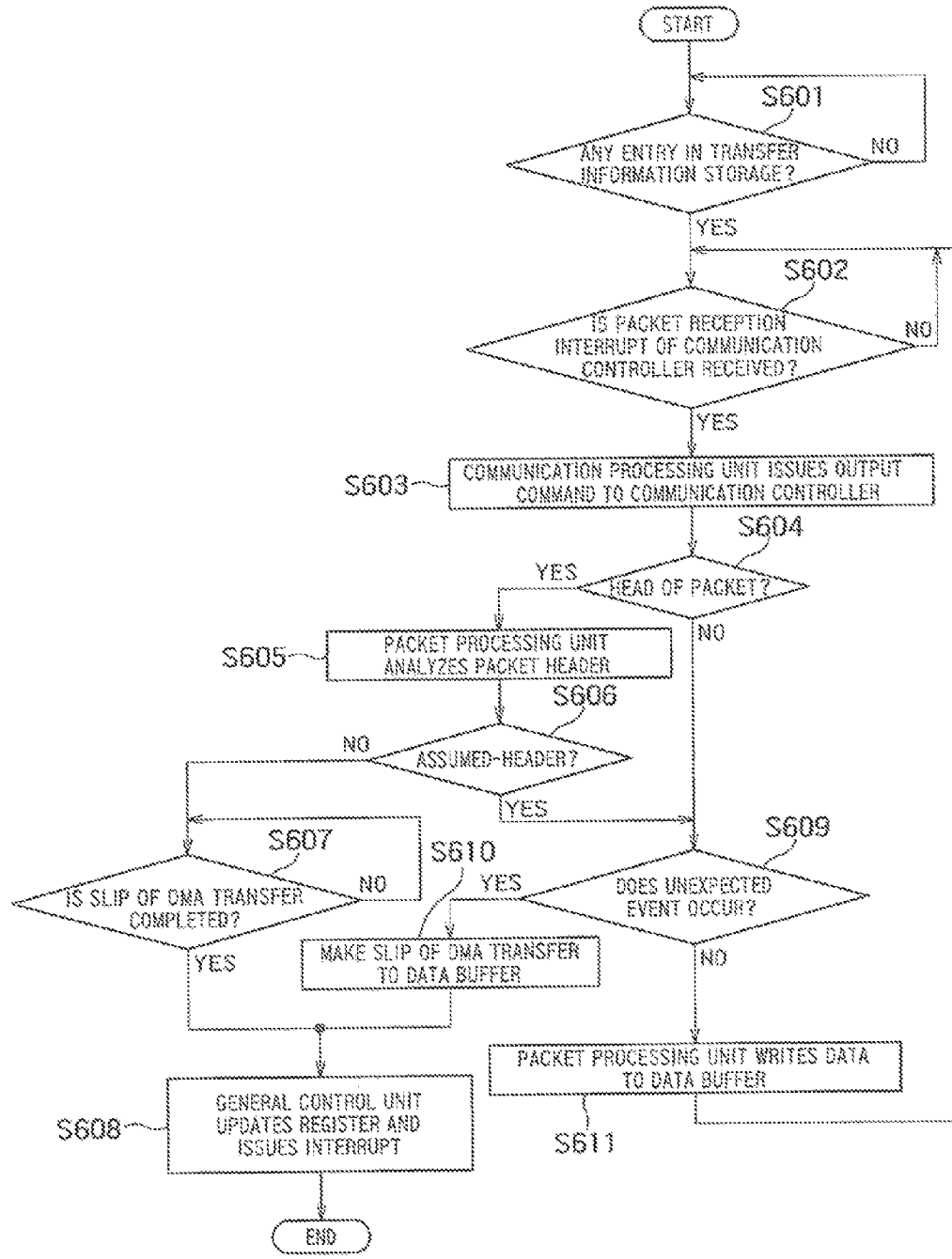
FIG. 11 is a flowchart showing an operation procedure conducted if an exceptional event occurs and if falling into an unsteady status.

FIG. 11 is a flowchart representing an operation procedure performed if an exceptional event occurs in the reception mode and if falling into an unsteady status.

A difference from the flowchart in the reception mode shown in FIG. 10 is a process in a case where the packet processing unit 14 determines, in the header analysis of the reception packet (refer to S505 in FIG. 10), that the header of the reception packet is the not-assumed header.

To start with, a premise is that the bridge device in the fourth embodiment has a configuration illustrated in FIG. 12. The communication controller 104 has a built-in DMA controller 104a, and the memory controller 103 has a built-in DMA controller 103a. In the data transfer based on these DMA controllers, the data transfer is, once started, desired to avoid stopping as much as possible.

The DMA transfer can be interrupted as a function possessed by the controller. Nevertheless, if instructed to interrupt, there is a case involving a procedure such as resetting the whole controllers for resuming the operation, and hence the resumption of the operation requires a comparatively long period of time. If the stopping time is elongate, it follows that a transfer speed decreases depending on a degree of this elongation. What has been described so far is a passive reason for stopping the DMA transfer.

Such being the case, in the fourth embodiment, if the exceptional event occurs after the once-started DMA transfer, the DMA transfer is slipped in the data buffer 16 to enable the data transfer to resume smoothly. When viewed from the controller, the DMA transfer appears to get completed safely without any interruption. When desiring to resume, the transfer information entry used for the DMA transfer is reused.

An expedient for slipping the DMA transfer is exemplified by a method of actually neither inputting nor outputting the data to the data buffer 16 while getting successful a bus access to the data buffer 16 from the controller (the communication controller or the memory controller). Note that this is one example but is not limited to this operation. For instance, any problem does not arise in terms of the operation even when inputting and outputting the data (unrelated data) to the data buffer 16.

Further, there exists a necessity for notifying the CPU 102 or MPU that the exceptional event occurs in the present bridge device and also that the DMA transfer is slipped as described above (the data that should be written to the data storage are not properly received). Therefore, the general control unit 11 is provided with a register 11a, which is stored with information on a factor (or cause) for the exceptional event and identifying information etc. of the controller (the communication controller or the memory controller) related to this factor. The register 11a functions as a unit for giving notification to the CPU or MPU.

The present bridge device advances the data transfer while the CPU or MPU is not aware of it, and hence such a notification mechanism to the CPU or MPU is needed. It is to be noted that the CPU or MPU has hitherto directly controlled each controller and executed the packet analyzing process, and, though the mechanism described above was not required, there was a problem that the load on the CPU increased and the transfer performance declined.

A flowchart will be explained based on what has described above.

Steps S601-S606 and S611 are the same as steps S501-S505 and S507 in FIG. 10, and therefore the description thereof is omitted.

The packet processing unit 14, as a result of analyzing the packet header, determines that the header is the not-assumed header (S606). At this time, the data buffer 16 inputs the data output by the communication controller 104 but does not actually buffer this data, and the DMA transfer is slipped till completed (S607). Notification saying that the data is correctly received (though not actually buffered) is returned to the communication controller 104. It appears to the communication controller 104 as if the DMA transfer gets successful. Hence, the communication controller 104 comes to a status of immediately accepting the DMA transfer. It should be noted that the data are not actually buffered in the fourth embodiment, and nevertheless any trouble does not occur in the operation even when buffered in fact. It may get enabled to determine that the DMA transfer is not properly conducted actually within the bridge device while making it appear as if the DMA transfer is correctly completed to communication controller 104.

The communication processing unit 13, upon receiving a completion-of-DMA-transfer interrupt from the communication controller 104, notifies the general control unit 11 of the occurrence of the exceptional event as triggered by this reception (S608). The general control unit 11 receiving the notification issues the interrupt to the CPU 102 or MPU. The CPU 102 or MPU receiving the interrupt operates corresponding to a content of the interrupt. For example, the general control unit 1 is instructed to redo the data transfer based on the transfer information entry as the case may be.

If being the assumed-header as a result of analyzing the packet header, it is next checked whether the exceptional event other than the header occurs or not (S609). Every imaginable information can be considered such as the status information of the communication controller 104, the status information of the memory controller 103, a content of a response to the command issued to the NAND memory and a packet length. This category embraces a case where a CRC (Cyclic Redundancy Check) error occurs in write target data storage.

Also in the case where such an event beyond the assumption occurs, the DMA transfer to the data buffer 16 from the communication controller 104 is slipped (S610), THE communication processing unit 13, upon receiving the completion-of-DMA-transfer interrupt, notifies the general control unit 11 that the exceptional event occurs as triggered by this reception (S608). The general control unit 11 receiving the notification issues the interrupt to the CPU 102 or MPU. The CPU 102 or MPU receiving the interrupt operates correspondingly to a content of the interrupt. For example, the general control unit 11 is instructed to redo the data transfer based on the transfer information entry.

(Fifth Embodiment)

What has been discussed so far is the flow of starting the transfer after the CPU 102 or MPU has prepared the transfer information entry of the whole target file in the transfer information storage 12.

A fifth embodiment will demonstrate a configuration of parallelizing a period for creating the transfer information entry with a data transfer period. This configuration improves a transmission rate of the file transfer as a whole by reducing a time lag till starting the transfer.

A register field indicating an operation start flag (refer to the register 11a in FIG. 12) is added to the general control unit 11, and, if this flag is set up and if the transfer information entry exists in the transfer information storage 12, the procedure is configured to immediately start the transfer.

The CPU 102 or MPU gets the data transfer started at a point of time when finishing the creation of the transfer information entries about not the whole but a part of the transfer target file. The remaining transfer information entries are created while getting the data transfer carried out. Each time the transfer information entry is created, the entry is added to the transfer information storage 12.

The procedure being thus done, the period for creating the transfer information entry can be parallelized with the data transfer period. Hence, the time lag till starting the transfer can be reduced, and, as a result, it is feasible to improve the transmission rate of the whole file transfer.

Herein, the general control unit 11 may issue the interrupt as triggered by such an event that the number of the transfer information entries is lower than a threshold value, this threshold value being a value concerning the number of the transfer information entries and being stored in the register of the general control unit 11. With this interrupt, the CPU or MPU is prompted to add the transfer information entry.

The parallelizing process in the fifth embodiment is effective also in a case where the work memory capacity is limited, and all the management information cannot be read at one time.

(Sixth Embodiment)

Figure 13:
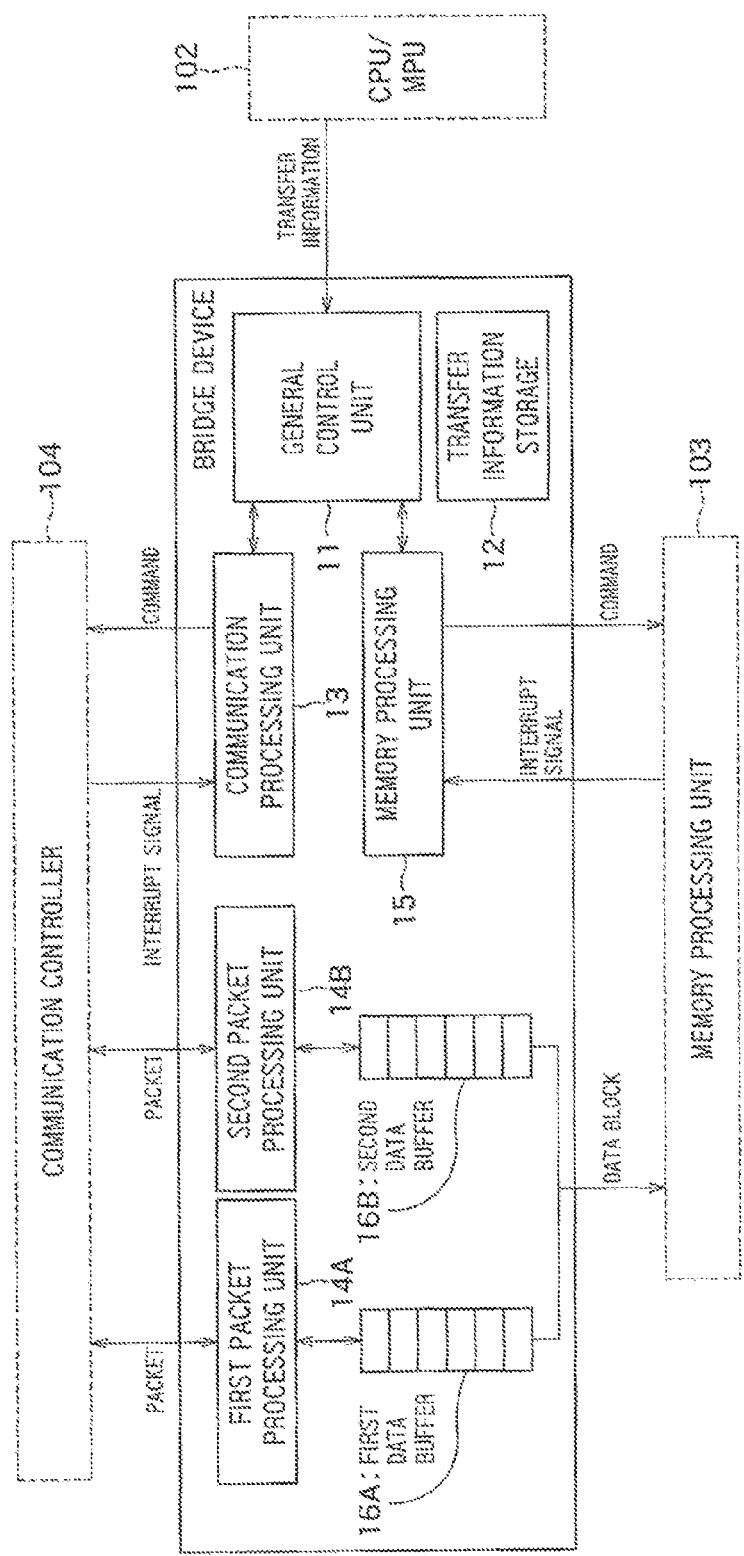
FIG. 13 is a diagram showing the bridge device according to a sixth embodiment.

FIG. 13 illustrates the bridge device according to a sixth embodiment,

The bridge device depicted in FIG. 13 has a configuration corresponding to a case in which the DMA controllers of the communication controller and the memory controller are capable of implementing the data transfer of N-channels (N is an integer equal to or larger than "2"). This configuration enables the simultaneous transfer via the plurality of channels to be performed.

The example illustrated in FIG. 13 shows a configuration in the case of having the two (N=2) channels. The two packet processing units and the two data buffers are provided. Specifically, the two packet processing units include a first packet processing unit 14A and a second packet processing unit 14B. The two data buffers include a first data buffer 16A and a second data buffer 16B.

The 2-channel transfers are simultaneously performed in the form of using the two transfer information entries simultaneously. The transfer direction of the two entries (the high-order two entries in the Table of FIG. 4) is a combination of R and W or a combination of W and R, the transfer can be attained by the method as described above.

On the other hand, an additional mechanism is needed for the two entries with the transfer directions being settled such as R→R and W→W. That is, it is necessary for the reception side not to confuse which entry that the data block belongs to is earlier.

Therefore, the bridge device on the transmission side adds, to the packet header, information indicating which entry that data belongs is earlier, i.e., pieces of identifying information indicating the order of the priority levels among the entries. Further, the order is previously set in each data buffer. The general control unit 11 may also set the order, A concrete example of the operation of the bridge device on the transmission side is that the memory processing unit 15 instructs the memory controller 103 to write the data in the data buffer having the same order of the entry. The memory controller 103 writes the data, which is read in response to the command corresponding to the entry, to the data buffer having the same order of the entry. Each packet processing unit adds, to the header, the identifying information of the order of the data buffer corresponding to the packet processing unit itself.

The communication controller 104 of the bridge device on the reception side distributes the data to the data buffer having the same order as the order specified by the identifying information. Moreover, the memory controller 103 writes the data read from each data buffer to the block address specified in the entry having the same order as the order of the data buffer.

Herein, there may be added a procedure of starting the data transfer after both of the transmission side and the reception side confirm that the 2-channel simultaneous transmission/reception can be done via broadcasting between the transmission side and the reception side in advance of executing the data transfer.

Note that the allocation of the data blocks in the transmission-side memory is not necessarily coincident with the allocation of the data blocks in the reception-side memory, i.e., the number and the size of the data blocks on the transmission side is not necessarily coincident with the number and the size of data blocks on the reception side. This being the case, for instance, in advance of the data transfer, the data block size of the transmission-side data storage on the transmission side is compared with the data block size of the transmission-side data storage on the reception side. Then, the smaller size is set as a unit of the transfer, and a pre-negotiation may be made so as to perform the 2-channel transmission/reception. If the data block size on the transmission side is larger, there is a possibility that the reception side cannot ensure the block having the same size, and nevertheless this problem is solved by setting the smaller data block size as the unit of the transfer in the pre-negotiation. In this case, the management information of the transmission-side file is changed in accordance with the post-changing allocation of the data blocks. Note that what has described in this paragraph can be applied to the case of 1-channel transfer as well as to the 2-channel transfer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A bridge device for bridging data transfer between a first controller accessing a data storage and a second controller provided with DMA (Direct Memory Access) transfer function, comprising:
   a reception unit configured to receive first transfer information specifying a read address of the data storage from an external device wherein one file is dividedly placed in a plurality of regions in the data storage, the regions are dispersed from each other, and each first transfer information specifies the read address of each of the plurality of regions;
   a transfer information storage to store the first transfer information therein;
   a first processing unit configured to generate a first command to instruct reading data from the read address of the data storage based on the first transfer information read from the transfer information storage, and to output the first command to the first controller;
   a data buffer configured to retain the data read by the first controller from the read address of the data storage; and
   a second processing unit configured to generate a second command to instruct reading of data by the DMA transfer from the data buffer, and to output the second command to the second controller, wherein
   when a predetermined exceptional event occurs, the data buffer outputs dummy data for the DMA transfer of the second controller so that the DMA transfer normally completes without outputting the data retained in the data buffer, and after the DMA transfer completes, the data buffer notifies an occurrence of the exceptional event to the external device.

2. The bridge device according to claim 1, further comprising an output unit,
   wherein the output unit configured to output the data in the data buffer to the second controller in response to a read request given from the second controller.

3. The bridge device according to claim 1, wherein the reception unit receives plural pieces of first transfer information,
   the transfer information storage stores the plural pieces of first transfer information in a way that allocates priority levels to the pieces of first transfer information according to a reception order, and
   the first processing unit generates earlier the first command for the first transfer information having the higher priority level.

4. The bridge device according to claim 1, wherein the first transfer information further specifies a write address of the data buffer,
   the data buffer retains the data read by the first controller at the write address, and
   the second processing unit generates the second command to instruct reading of the data from the write address.

5. The bridge device according to claim 1, further comprising a control procedure storage configured to store a control procedure of each of a plurality of second controllers,
   wherein the second processing unit generates the second command in accordance with the control procedure of a targeted second controller out of the plurality of second controllers and sends the second command to the targeted second controller.

6. The bridge device according to claim 1, further comprising a control procedure storage store a control procedure of each of a plurality of first controllers,
   wherein the first processing unit generates the first command in accordance with the control procedure of a targeted first controller out of the plurality of first controllers and sends the first command to the targeted first controller.

7. The bridge device according to claim 1, wherein a process of receiving the first transfer information from the external device and storing the first transfer information in the transfer information storage is executed in parallel with a process of reading the first transfer information from the transfer information storage and generating and outputting the first command.

8. The bridge device according to claim 1, wherein N-pieces of data buffers (N is an integer equal to or larger than "2") are provided,
   the reception unit receives plural pieces of first transfer information,
   the transfer information storage stores the plural pieces of first transfer information in a way that allocates priority levels to the plural pieces of first transfer information according to a reception order,
   orders are previously set between the N-pieces of data buffers,
   the first processing unit generates, based on N-pieces of first transfer information having higher priority levels out of the plural pieces of first transfer information, first commands each to instruct writing the data into each of the data buffers having same order as an order of each of the N-pieces of first transfer information based on the higher priority levels,
   the N-pieces of data buffers respectively retain the data input from the first controller,
   the second processing unit generates second commands each to instruct reading the data from each of the N-pieces of data buffers, and sends the second commands to the second controller, and
   the data read from each of the N-pieces of data buffers is attached with identification information indicating the order of each the N-pieces of data buffers and is output to the second controller.

9. A storage device comprising:
   the bridge device according to claim 1;
   the first controller;
   the second controller;
   the data storage; and
   a CPU or MPU as the external device.

10. A bridge device for bridging data transfer between a first controller accessing a data storage and a second controller provided with DMA (Direct Memory Access) transfer function, comprising:
   a reception unit configured to receive first transfer information specifying a write address of the data storage from an external device wherein each first transfer information specifies the write address of each of a plurality of regions so that one file is dividedly placed in the plurality of regions in the data storage and the regions are dispersed from each other;
   a transfer information storage to store the first transfer information therein;
   a first processing unit configured to generate a first command to instruct writing of data by the DMA transfer into a data buffer, based on the first transfer information read from the transfer information storage, and output the first command to the second controller;
   the data buffer configured to receive the data output from the second controller and retain the data therein; and
   a second processing unit configured generate a second command to instruct writing of the data from the data buffer into the data storage at the write address, wherein when a predetermined exception event occurs, the data buffer discards data written by the DMA transfer of the second controller so that the DMA transfer normally completes and after the DMA transfer completes, the data buffer notifies an occurrence of the exceptional event to the external device.

11. The bridge device according to claim 10, wherein the first transfer information further specifies a write address of the data buffer,
the first processing unit generates the first command to instruct writing the data at the write address of the data buffer, and
the second processing unit generates the second command to instruct reading the data from the write address of the data buffer.

12. The bridge device according to claim 10, further comprising a packet processing unit,
wherein the data transferred by the DMA transfer are carried in a packet, and
the packet processing unit analyzes a header of the packet and thereby detects whether the exceptional event occurs or not.

13. The bridge device according to claim 10, wherein a first process of receiving the first transfer information from the external device and storing the received first transfer information in the transfer information storage is executed in parallel with a second process of reading the first transfer information from the transfer information storage and generating the first command.

14. The bridge device according to claim 10, wherein N-pieces of data buffers (N is an integer equal to or larger than "2") are provided,
the reception unit receives plural pieces of first transfer information,
the transfer information storage stores the plural pieces of first transfer information in a way that allocates priority levels to the plural pieces of first transfer information according to a reception order,
orders are previously set between the N-pieces of data buffers,
the first processing unit generates, based on N-pieces of first transfer information of higher priority levels out of the plural pieces of first transfer information, first commands each to instruct writing the data into the data buffer having same order as an order of each of the N-pieces of first transfer information based on the higher priority levels,
the N-pieces of data buffers respectively retain the data input from the second controller,
the second processing unit generates second commands each to instruct reading the data from each of the N-pieces of data buffers and writing the data at the write address specified by each of the N-pieces of first transfer information having same order as the order of each of the N-pieces of data buffers, and sends the second commands to the first controller.

15. A non-transitory computer readable medium having instructions stored therein which when executed by a processor, cause the processor to perform processing of steps for bridging data transfer between a first controller accessing a data storage and a second controller provided with DMA (Direct Memory Access) transfer function, comprising:
receiving first transfer information specifying a read address of a data storage from an external device wherein one file is dividedly placed in a plurality of regions in the data storage, the regions are dispersed each other, and each first transfer information specifies the read address of each of the plurality of regions;
storing the first transfer information in a transfer information storage;
generating a first command to instruct reading data from the read address of the data storage based on the first transfer information read from the transfer information storage, and outputting the first command to a first controller accessing the data storage;
retaining the data read by the first controller from the read address of the data storage, in a data buffer;
generating a second command to instruct reading of data by the DMA transfer from the data buffer, and outputting the second command to a second controller; and
outputting dummy data for the DMA transfer of the second controller when a predetermined exceptional event occurs so that the DMA transfer normally completes without outputting the data retained in the data buffer, and after the DMA transfer completes, notifying an occurrence of the exceptional event to the external device.

16. A non-transitory computer readable medium having instructions stored therein which when executed by a processor, causes the processor to perform processing steps for bridging data transfer between a first controller accessing a data storage and a second controller provided with DMA (Direct Memory Access) transfer function, comprising:
receiving first transfer information specifying a write address of a data storage from an external device wherein each first transfer information specifies the write address of each of a plurality of regions so that one file is dividedly placed in the plurality of regions in the data storage and the regions are dispersed each other,
storing the first transfer information in a transfer information storage,
generating a first command to instruct writing of data by the DMA transfer into a data buffer, based on the first transfer information read from the transfer information storage and outputting the first command to the second controller,
receiving the data output from the second controller and retaining the data in the data buffer,
generating a second command to instruct writing of the data from the data buffer into the data storage at the write address and outputting the second command to a first controller, and
discarding data written by the DMA transfer of the second controller when a predetermined exceptional event occurs so that the DMA transfer normally completes, and after the DMA transfer completes, notifying an occurrence of the exceptional event to the external device.

17. A bridge device for bridging data transfer between a first controller accessing a data storage and a second controller, the first controller being provided with DMA (Direct Memory Access) transfer function, the bridge device comprising:
a reception unit configured to receive first transfer information specifying a read address of the data storage from an external device wherein one file is dividedly placed in a plurality of regions in the data storage, the regions are dispersed each other, and each first transfer information specifies the read address of each of the plurality of regions;
a transfer information storage to store the first transfer information therein;

a first processing unit configured to generate a first command to instruct reading of data by the DMA transfer from the read address of the data storage based on the first transfer information read from the transfer information storage, and to output the first command to the first controller;

a data buffer configured to retain the data read by the first controller from the read address of the data storage therein; and a second processing unit configured to generate a second command to instruct reading of data from the data buffer, and to output the second command to the second controller, wherein when a predetermined exceptional event occurs, the data buffer discards data written by the DMA transfer into the data buffer until the DMA transfer completes, and after the DMA transfer normally completes, the data buffer notifies an occurrence of the exceptional event to the external device.

18. A bridge device for bridging data transfer between a first controller accessing a data storage and a second controller, the first controller being provided with DMA (Direct Memory Access) transfer function, comprising:

a reception unit configured to receive first transfer information specifying a write address of the data storage from an external device wherein each first transfer information specifies the write address of each of a plurality of regions so that one file is dividedly placed in the plurality of regions in the data storage and the regions are dispersed each other;

a transfer information storage to store the first transfer information therein;

a first processing unit configured to output generate a first command to instruct writing of data into a data buffer, based on the first transfer information read from the transfer information storage, and output the first command to the second controller;

the data buffer configured to receive the data output from the second controller and retain the data; and a second processing unit configured to generate a second command to instruct writing of the data by the DMA transfer from the data buffer into the data storage at the write address and output the second command to the first controller wherein when a predetermined exceptional event occurs, the data buffer outputs dummy data for the DMA transfer of the first controller until the DMA transfer of the first controller completes, and after the DMA transfer normally completes, the data buffer notifies an occurrence of the exceptional event to the external device.

19. A non-transitory computer readable medium having instructions stored therein which when executed by a processor, causes the processor to perform processing steps for bridging data transfer between a first controller accessing a data storage and a second controller, the first controller being provided with DMA (Direct Memory Access) transfer function, comprising:

receiving first transfer information specifying a read address of a data storage from an external device wherein one file is dividedly placed in a plurality of regions in the data storage, the regions are dispersed each other, and each first transfer information specifies the read address of each of the plurality of regions;

storing the first transfer information in a transfer information storage;

generating a first command to instruct reading of data by the DMA transfer from the read address of the data storage based on the first transfer information read from the transfer information storage, and outputting the first command to a first controller accessing the data storage;

retaining the data read by the first controller from the read address of the data storage, in a data buffer;

generating a second command to instruct reading of data from the data buffer, and outputting the second command to a second controller; and discarding data written by the DMA transfer into the data buffer when a predetermined exceptional event occurs until the DMA transfer of the first controller completes, and after the DMA transfer normally completes, notifying an occurrence of the exceptional event to the external device.

20. A non-transitory computer readable medium having instructions stored therein which when executed by a processor, causes the processor to perform processing steps for bridging data transfer between a first controller accessing a data storage and a second controller, the first controller being provided with DMA (Direct Memory Access) transfer function, comprising:

receiving first transfer information specifying a write address of a data storage from an external device wherein each first transfer information specifies the write address of each of a plurality of regions so that one file is dividedly placed in the plurality of regions in the data storage and the regions are dispersed each other, storing the first transfer information in a transfer information storage, generating a first command to instruct writing of data into a data buffer, based on the first transfer information read from the transfer information storage and outputting the first command to the second controller, receiving the data output from the second controller and retaining the data in the data buffer, generating a second command to instruct writing of the data by the DMA transfer from the data buffer into the data storage at the write address and outputting the second command to a first controller, and outputting dummy data for the DMA transfer of the first controller when a predetermined exceptional event occurs until the DMA transfer of the first controller completes, and after the DMA transfer normally completes, notifying an occurrence of the exceptional event to the external device.

21. A bridge device for bridging data transfer between a first controller accessing a data storage and a second controller, comprising:

a reception unit configured to receive a plurality of first transfer information each specifying a read address of the data storage from an external device wherein one file is dividedly placed in a plurality of regions in the data storage, the regions are dispersed each other, and each first transfer information specifies the read address of each of the plurality of regions;

a transfer information storage to store the first transfer information therein;

a first processing unit configured to generate a first command to instruct reading data from the read address of the data storage based on the first transfer information read from the transfer information storage, and to output the first command to the first controller;

a data buffer configured to retaine the data read by the first controller from the read address of the data storage therein; and a second processing unit configured to generate a second command to instruct reading of data from the data buffer, and to output the second command to the second controller, wherein a first process of receiving the first transfer information from the external device and storing the received first transfer information in the transfer information storage is executed in parallel with a second process of reading the first transfer information from the transfer information storage and generating and outputting the first command.

22. A bridge device for bridging data transfer between a first controller accessing a data storage and a second controller, comprising:

a reception unit configured to receive first transfer information specifying a write address of the data storage from an external device wherein each first transfer information specifies the write address of each of a plurality of regions so that one file is dividedly placed in the plurality of regions in the data storage and the regions are dispersed each other;

a transfer information storage to store the first transfer information therein;

a first processing unit configured to generate a first command to instruct writing of data into a data buffer, based on the first transfer information read from the transfer information storage, and output the first command to the second controller;

the data buffer configured to receive the data output from the second controller and retain the data; and a second processing unit configured to generate a second command to instruct writing of the data from the data buffer into the data storage at the write address, wherein a first process of receiving the first transfer information from the external device and storing the received first transfer information in the transfer information storage is executed in parallel with a second process of reading the first transfer information from the transfer information storage and generating and outputting the first command.

23. A non-transitory computer readable medium having instructions stored therein which when executed by a processor, cause the processor to perform processing of steps for bridging data transfer between a first controller accessing a data storage and a second controller, comprising:

receiving first transfer information specifying a read address of a data storage from an external device wherein one file is dividedly placed in a plurality of regions in the data storage, the regions are dispersed each other, and each first transfer information specifies the read address of each of the plurality of regions;

storing the first transfer information in a transfer information storage;

generating a first command to instruct reading data from the read address of the data storage based on the first transfer information read from the transfer information storage, and outputting the first command to a first controller accessing the data storage;

retaining the data read by the first controller from the read address of the data storage, in a data buffer; and generating a second command to instruct reading of data from the data buffer, and outputting the second command to a second controller, wherein a first process of receiving the first transfer information from the external device and storing the received first transfer information in the transfer information storage is executed in parallel with a second process of reading the first transfer information from the transfer information storage and generating and outputting the first command.

24. A non-transitory computer readable medium having instructions stored therein which when executed by a processor, causes the processor to perform processing steps for bridging data transfer between a first controller accessing a data storage and a second controller, comprising:

receiving first transfer information specifying a write address of a data storage from an external device wherein each first transfer information specifies the write address of each of a plurality of regions so that one file is dividedly placed in the plurality of regions in the data storage and the regions are dispersed each other;

storing the first transfer information in a transfer information storage;

generating a first command to instruct writing of data into a data buffer, based on the first transfer information read from the transfer information storage and outputting the first command to the second controller;

receiving the data output from the second controller and retaining the data in the data buffer; and generating a second command to instruct writing of the data from the data buffer into the data storage at the write address and outputting the second command to the first controller, wherein a first process of receiving the first transfer information from the external device and storing the received first transfer information in the transfer information storage is executed in parallel with a second process of reading the first transfer information from the transfer information storage and generating and outputting the first command.

* * * * *